United States Patent

Doi

[11] Patent Number: 5,179,449
[45] Date of Patent: Jan. 12, 1993

[54] SCENE BOUNDARY DETECTING APPARATUS

[75] Inventor: Miwako Doi, Kanagawa, Japan

[73] Assignee: Kabushiki Kaisha Toshiba, Kawasaki, Japan

[21] Appl. No.: 463,466

[22] Filed: Jan. 11, 1990

[30] Foreign Application Priority Data

Jan. 11, 1989 [JP] Japan ................................. 1-2934

[51] Int. Cl.⁵ .............................................. H04N 9/79
[52] U.S. Cl. .................................... 358/311; 358/335; 360/14.1
[58] Field of Search ............... 358/311, 310, 335, 906, 358/909, 182, 183, 22; 360/14.1, 33.1, 35.1

[56] References Cited

U.S. PATENT DOCUMENTS

| 4,774,582 | 9/1988 | Hakamada et al. | 358/182 |
| 4,890,168 | 12/1989 | Inoue et al. | 358/183 |
| 4,974,111 | 11/1990 | Platte et al. | 358/311 |
| 4,985,755 | 1/1991 | Shimoda et al. | 358/183 |
| 4,990,782 | 2/1991 | Sakamoto et al. | 358/183 |
| 4,998,171 | 3/1991 | Kim et al. | 358/183 |

Primary Examiner—Roy N. Envall, Jr.
Assistant Examiner—Thai Tran
Attorney, Agent, or Firm—Oblon, Spivak, McClelland, Maier & Neustadt

[57] ABSTRACT

A dynamic image editor apparatus for video tape automatically moves to the beginning frames of scenes. A characteristic data such as the illuminance of each frame is measured. Neighboring frames are compared to detect the change in the characteristic data between frames. When the difference exceeds a threshold level a scene boundary is determined. The editor may then automatically move to a scene boundary in the forward or rewind direction so that the user can edit the scenes at exactly the boundary frame.

12 Claims, 8 Drawing Sheets

| POINTER | FRAME |
|---------|-------|
| 1 | 1 |
| 2 | 84 |
| 3 | 518 |

SCENE BOUNDARY DETECTING APPARATUS

BACKGROUND OF THE INVENTION

1. Field of the Invention

The present invention relates to an editing apparatus for a series of dynamic images and more particularly to an editing apparatus for a video tape consisting of a plurality of frames arranged into a series of different scenes.

2. Description of the Background

Recently, video cameras have been used for filming various home events such as picnics and parties due to the portability of small video cameras. At the same time, recording of television programs using a fixed recorder has also increased. Under both of these situations the editing of video tape often occurs at home. For example, it is often desired to erase the commercial parts from a recorded television program by dubbing the desired part of the tape onto a second tape. It may also be desired to copy only one scene, such as a picnic from a tape showing home events onto a second tape. Under these circumstances, it is necessary for the editor to stop the play of the original video tape at the beginning of the desired scene which is the boundary between two scenes. This could be the boundary between the commercial scene and the desired program or between two home events such as a party scene and a picnic scene. However, using present devices it is difficult to find this boundary. If the user tries to designate the stop position by watching the image, he cannot stop at the boundary line exactly. Accordingly, it often happens that some part of the scene is omitted or part of an undesired scene is included. It may also occur that when the tape is being played the user may want to see only a zoomed part and stop just before this part. When this happens the user must designate the stop position while watching the television display. It is often a problem that the position at which the user stops may actually be a number of frames forward or behind the boundary position.

Thus, present dynamic image editing apparatus makes it difficult for the user to stop at a boundary point (such as the starting frame of a commercial film, or the ending frame of a scene from a video camera) on the video tape at the exact point.

SUMMARY OF THE INVENTION

Accordingly, it is one object of the present invention to provide a dynamic image editor apparatus which can stop at a boundary point on a video tape exactly.

It is another object of the present invention to provide a dynamic image editor apparatus which can stop at a boundary regardless of whether the mode of the machine is play, fast forward or rewind.

It is another object of this invention to provide a dynamic image editor apparatus which recognizes a scene boundary according to a feature such as lightness or color of the video signal.

These and other objects of the present invention are accomplished by analyzing characteristic data (such as illuminance, volume, color-tone or density) for every frame on the video tape. According to the change of the characteristic data between neighboring frames, a scene boundary between changing images is detected. The tape may then be controlled to stop according to the scene boundary during a play, fast forward or rewind mode. As a result of this arrangement, the beginning frame for a series of scenes can be detected exactly.

DESCRIPTION OF THE PREFERRED EMBODIMENTS

Figure 1:
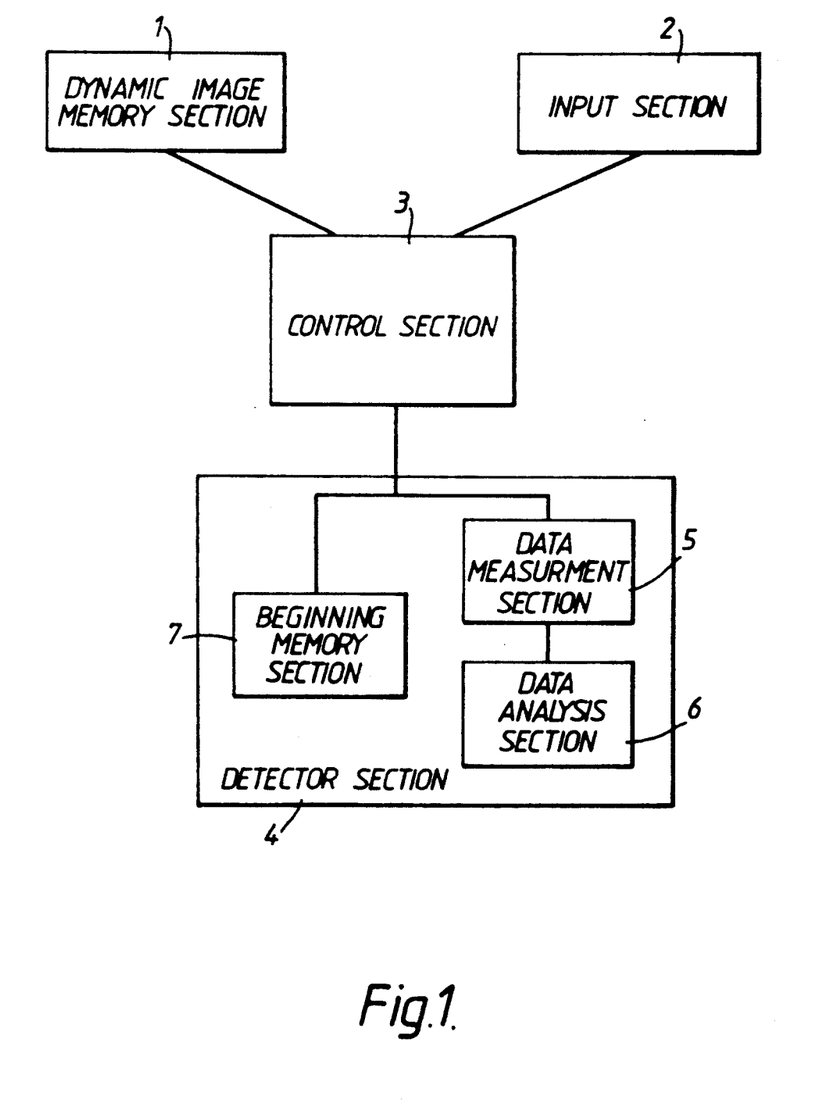
FIG. 1 shows a schematic of a dynamic image editor apparatus of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows the construction of a dynamic image editor apparatus according to the present invention. A dynamic image memory section 1 which is a recording medium of a video tape, CD, etc., memorizes a dynamic image from a video signal. Detector section 4 analyzes the characteristic data of the dynamic image.

The input section 2 has manually operated switches for varying modes of operation. In addition to the normal switches for play, fast forward and rewind, the input section has switches for beginning-forward and beginning-rewind. The control section 3 controls the passage of signals among the memory section 1, the input section 2 and the detector section 4.

Figure 2:
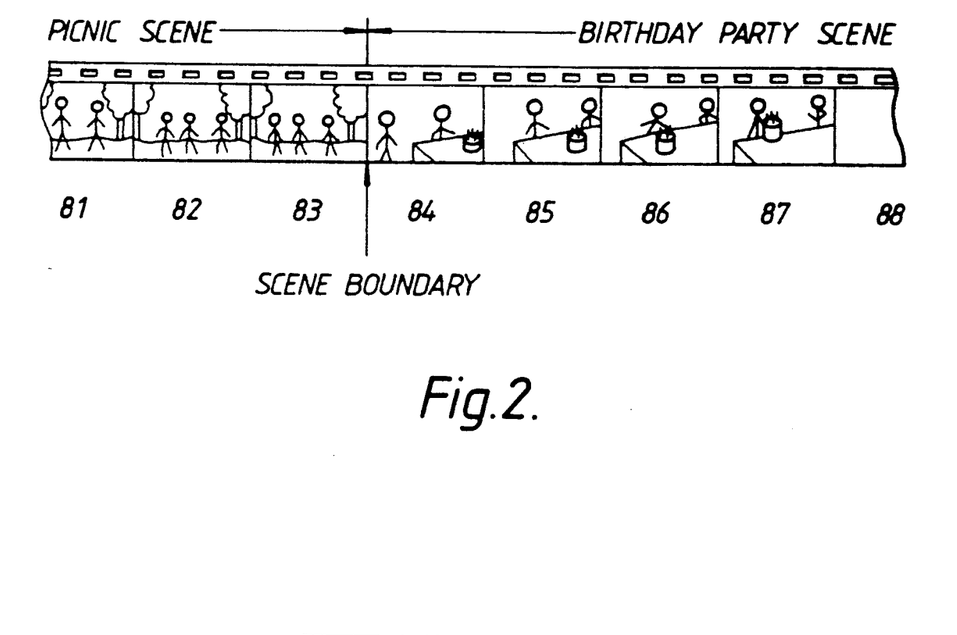
FIG. 2 shows an example of a boundary between scenes.

FIG. 2 shows a part of a video tape having a scene boundary between two scenes which may be detected by detecting section 4. Frame numbers are placed below each frame of the scenes. The frames up through 83 relate to a picnic scene while the scene starting with frame 84 relate to a birthday party. A scene boundary occurs between frames 83 and 84. The present apparatus acts to find this scene boundary at the beginning of the birthday party scene.

The detector section 4 includes a data measurement section 5, data analysis section 6 and a beginning memory 7. The data measurement section 5 measures at least one characteristic such as illuminance, volume, color-tone and density for the video signal from each frame. The data analysis section 6 compares the values of the measured characteristic data between adjacent frames and detects the beginning frame in a scene when there is a large differential in the characteristic between two frames. The beginning memory section 7 memorizes the frame number of the beginning frame of a scene as detected by the data analysis section 6.

The data measurement section 5 takes a measurement of a specific feature such as the lightness or color hue of a video signal and integrates it over the entire frame. For example in the case of a lightness analysis, the data measurement section can use information from the automatic gain controller which contains a signal used for fixing the lightness gain in a frame. A simple example of the type of circuit necessary for this is a standard integration circuit using a resistor and capacitor.

Figure 5A:
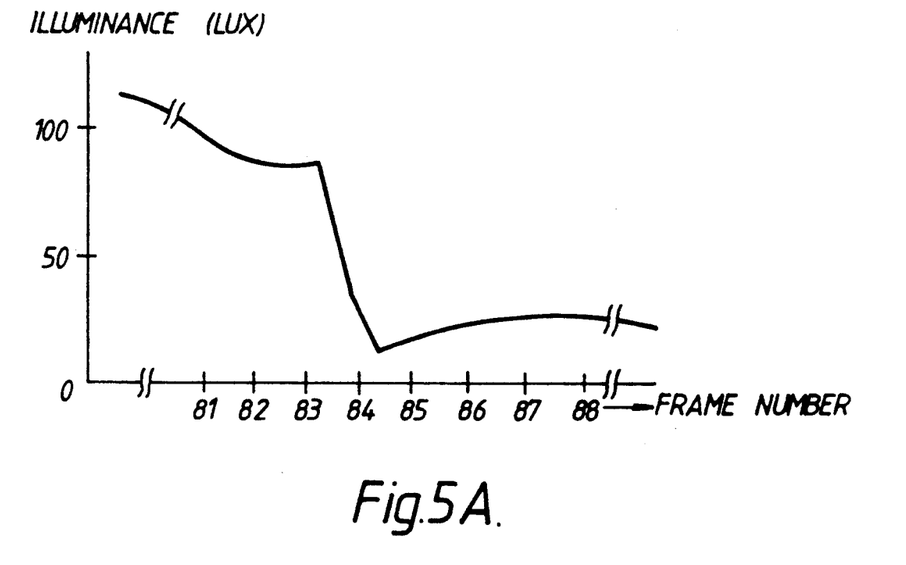
FIGS. 5a, 5b, 6A to 6F show specific examples of data analysis according to the present invention.

FIG. 5a shows an example of the output of the data measurement section. The frame numbers are plotted along the horizontal axis while the illuminance is plotted vertically. As can easily be seen, when the scene changes from frame 83 to frame 84 the level of illuminance changes drastically.

Figure 5B:
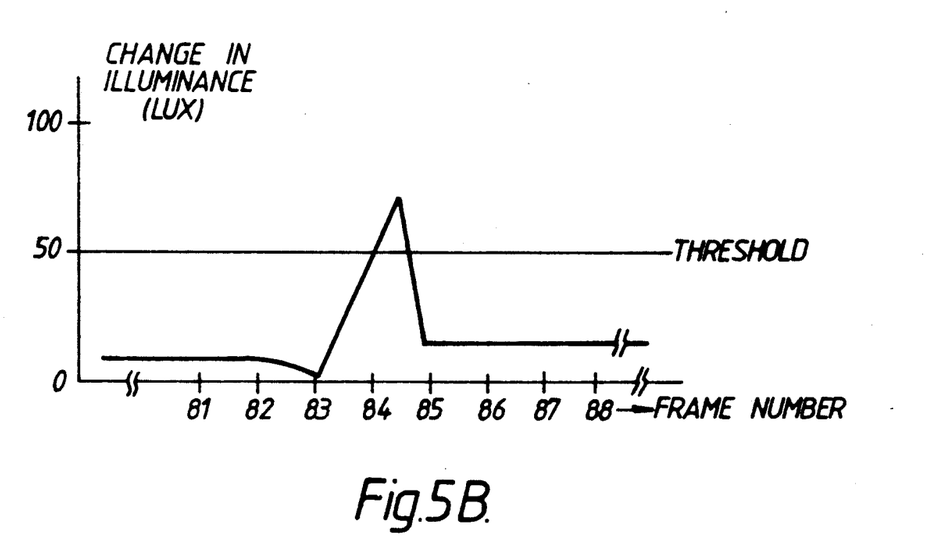

In FIG. 5b the difference in illuminance between a frame and its neighboring frame is plotted against the frame numbers. As is easily seen, the scene boundary between frames 83 and 84 shows a much larger difference than between the other frames since a change in scene occurs. A threshold value such as a difference of 50 lux can be established in advance. Any frames which exceed this threshold level are indicated as being boundaries between scenes. In this case, frame 84 is considered to be a boundary and the beginning of a new scene. The particular value of the threshold which is selected may be varied. If the threshold value is set too low, it will never fail to detect a beginning frame. However, it may also detect mistakingly other frames which are not beginning frames. Since the user can keep skipping to the scene he desires this is usually not a problem. If higher thresholds are utilized there is a possibility that the beginning of some scenes may be missed. However, no extraneous beginnings will occur.

Other types of characteristic data may be used in place of illuminance. Thus, these may involve volume, color-tone, density and so on.

Figure 6A:
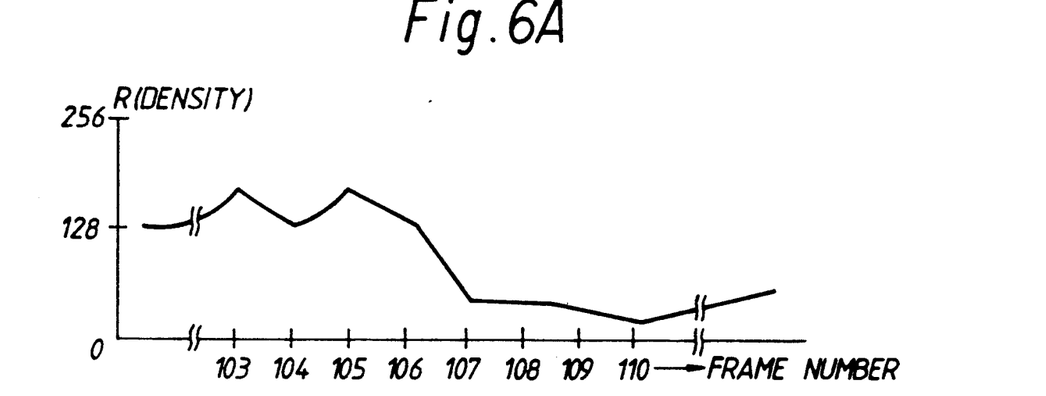
Figure 6B:
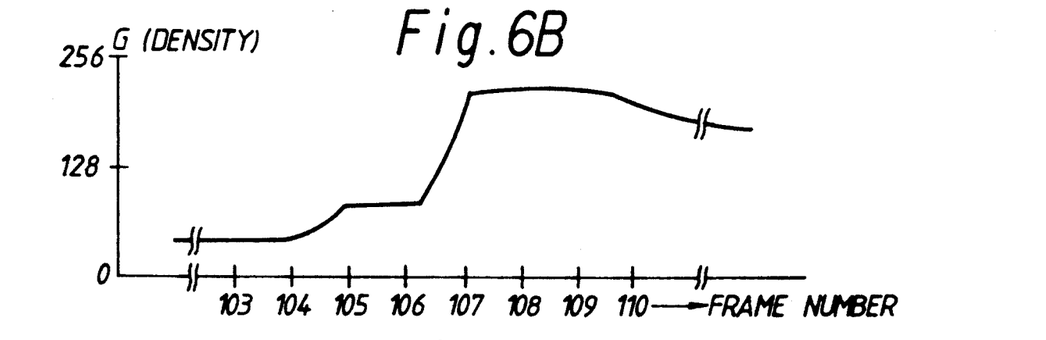
Figure 6C:
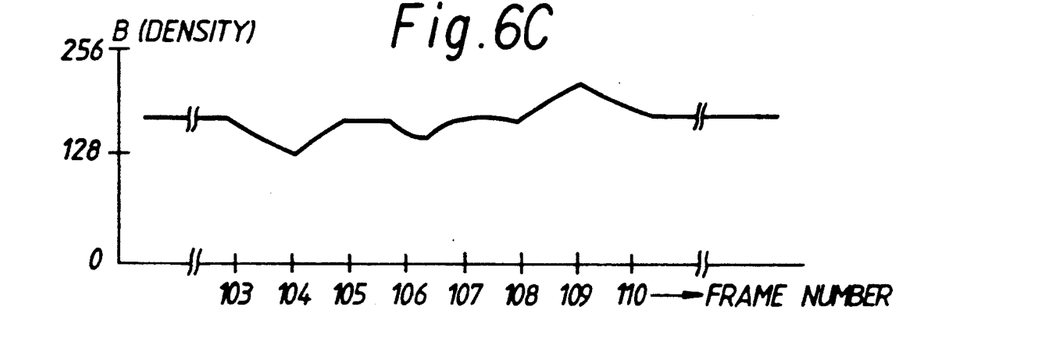
Figure 6D:
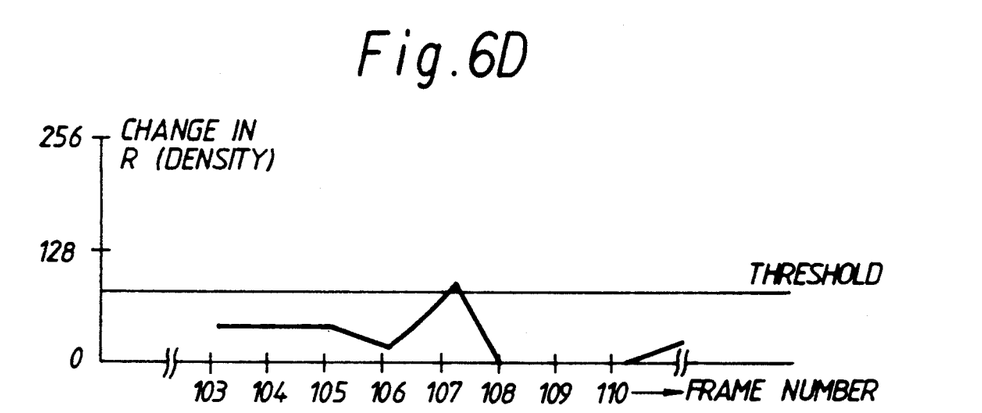
Figure 6E:
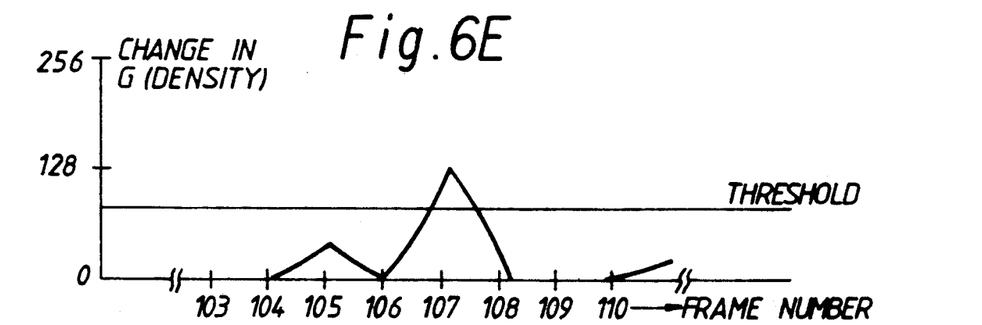
Figure 6F:
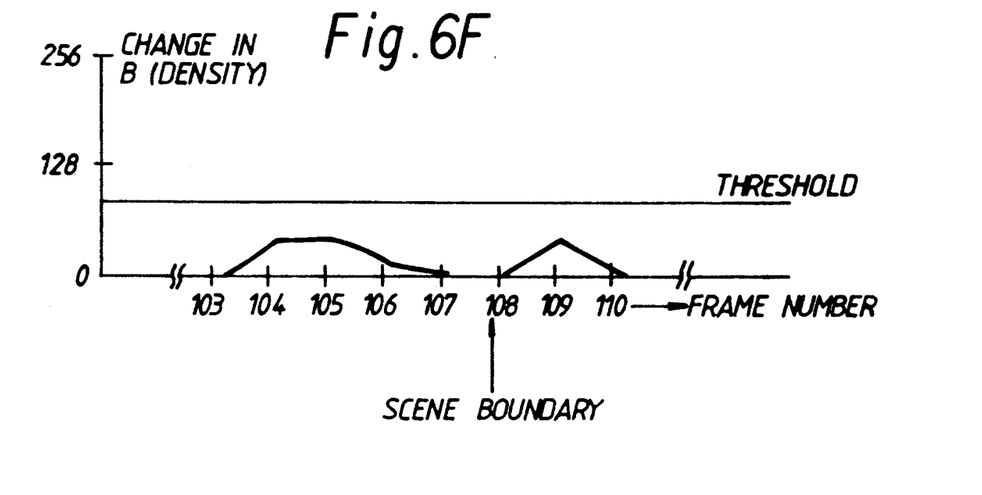

FIG. 6a and 6b show an example of using color density for making the same determination. Three charts are shown in FIG. 6a to show the density of red, green and blue colors for the various frames. The differences between frames is plotted in FIG. 6b in the same manner as shown in FIG. 5b except that a separate chart is shown for each color. If at least one color has a difference which exceeds a threshold, a scene boundary is determined. Thus, in FIG. 6b frame 107 is considered to be a boundary since both red and green difference values exceed the threshold.

Figure 4:
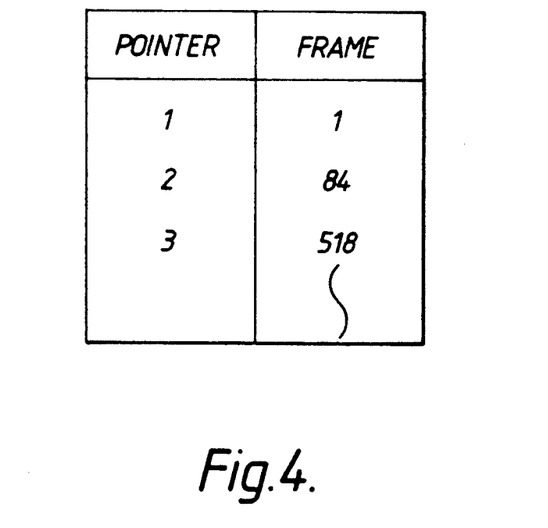
FIG. 4 shows one format of the top memory section according to the present invention.

Once the scene boundaries are detected, they may be recorded in the beginning memory section 7. FIG. 4 shows a simple recording method for holding the information in the top member section. Thus, the various scene boundaries are associated by sequential pointer numbers in the memory. This memory is utilized if the tape is first subjected to an analysis operation so that all of the scene boundaries discovered and recorded. After all of these boundaries are detected, the editing operation begins using the pointer numbers to control the scenes to be observed. A second possibility is to do the analysis in real time, that is to form a one step operation by determining scene boundaries as the video tape is first scanned and stopping at the boundaries as necessary. In this operation the beginning memory section is not utilized.

Figure 3:
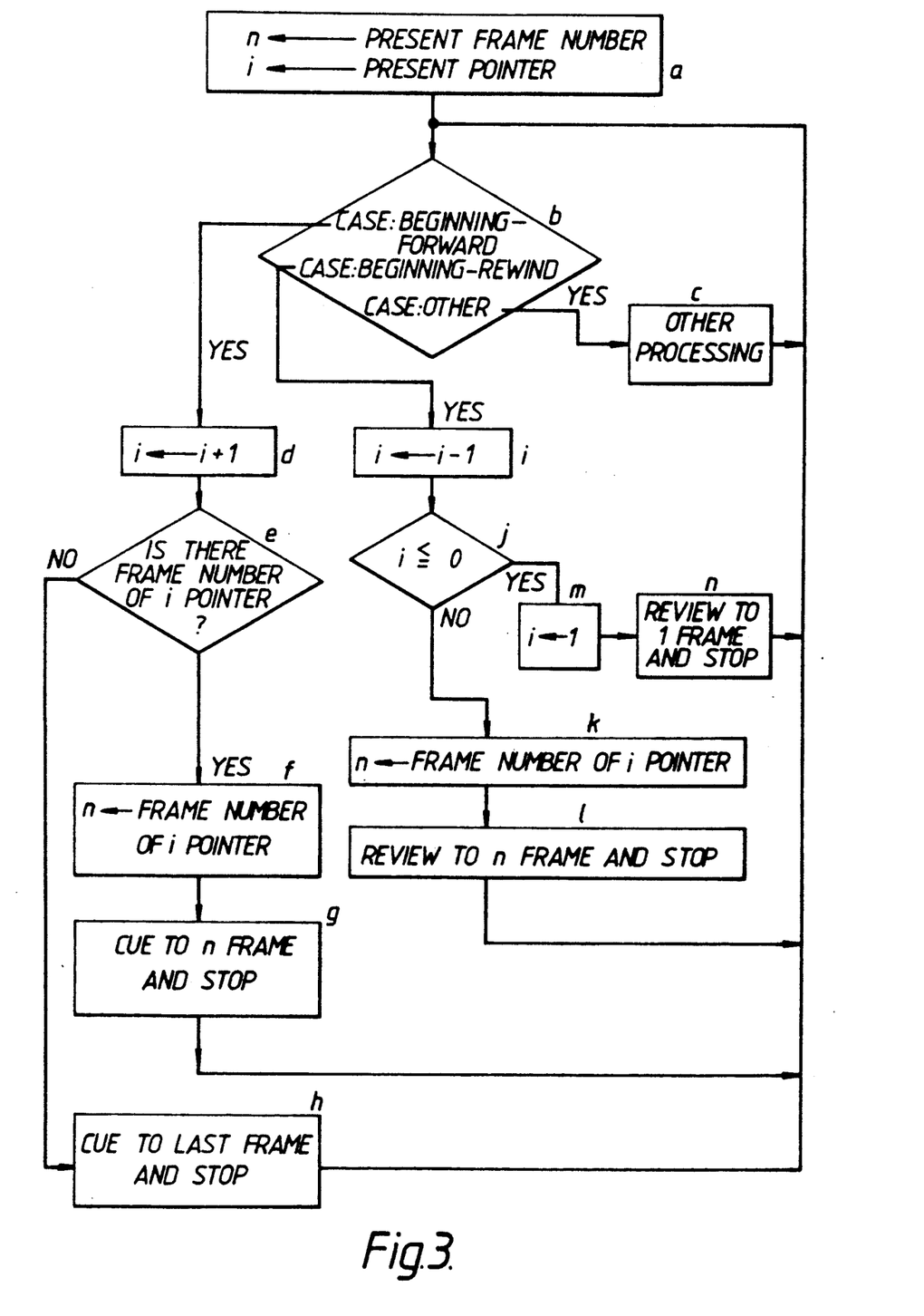
FIG. 3 shows a flow chart of the process for finding a scene boundary according to the present invention.

FIG. 3 shows a flow chart for the control of the tape for the beginning-forward and beginning-rewind modes using the two step method. In preliminary step a the present frame number is assigned as n. i is assigned the pointer number from the beginning memory section which corresponds to the last scene boundary. For example, if the present frame number is 73, n=73. Since 73 falls between frame 1 and frame 84 i is given the value of 1.

In step b, the mode of operation is determined to be the beginning-forward mode which leads to step d, the beginning-rewind mode which leads to step i or other modes which lead to step c. In the case of other modes, the appropriate processing occurs which is not part of the present invention. For the beginning forward mode, i is increased by 1 and the frame number for that pointer determined, if there is one. If not, the tape is moved to the last frame and stopped. If there is a frame number, the tape moves to that position and stops. Therefore, in the present example since the present frame number is 73 the tape will move to frame 84 and stop. The user may then view or record beginning with the party scene.

In the case of a beginning-rewind mode the pointer is first reduced by 1. If the resultant pointer is less than or equal to zero, it is reset to 1 and the tape is rewound to the beginning of the tape, that is, frame 1 and stopped. If i is greater than 0, the frame number of that pointer is determined and the tape wound to that point and stopped.

Thus, in operation a tape is first measured frame-by-frame according to a characteristic such as illuminance and the differences between adjoining frames is determined and compared to a threshold. When a threshold is exceeded, a scene boundary is determined and recorded in the beginning memory section. When the editing operation proceeds, the beginning of the next higher or lower scene may be automatically obtained depending upon which mode is selected.

In a second embodiment, the memory section is not used and the frames are examined in real time one at a time in an increasing or decreasing manner until the next scene boundary is discovered.

Figure 8:
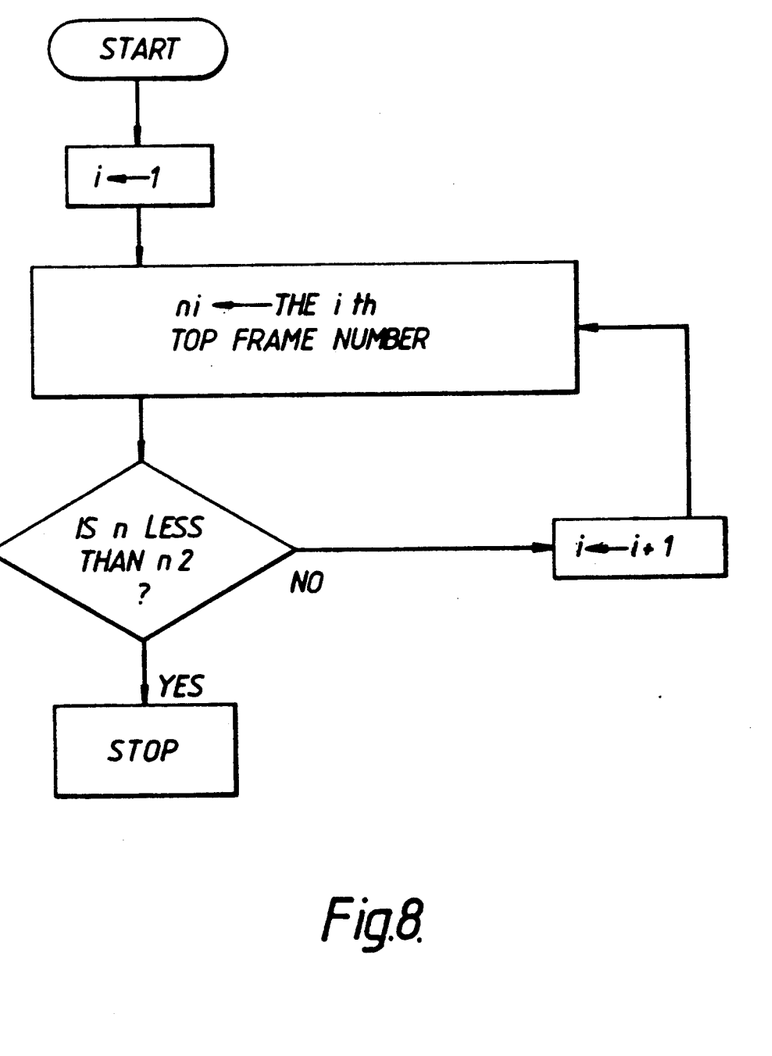
FIG. 8 shows a flow chart for the determining process according to the present invention.

FIG. 8 shows a flow chart of the process for determining how the number i, the pointer number of the scene boundary is determined by the number n, the current frame number and the contents of the beginning memory section. This process is done in conjunction with the process of FIG. 3. The pointer number i is increased one at a time until the frame number corresponding to that pointer is greater than the current frame number. In other words, the pointer number given to the scene boundary is the next highest pointer beyond the present scene number.

Figure 7:
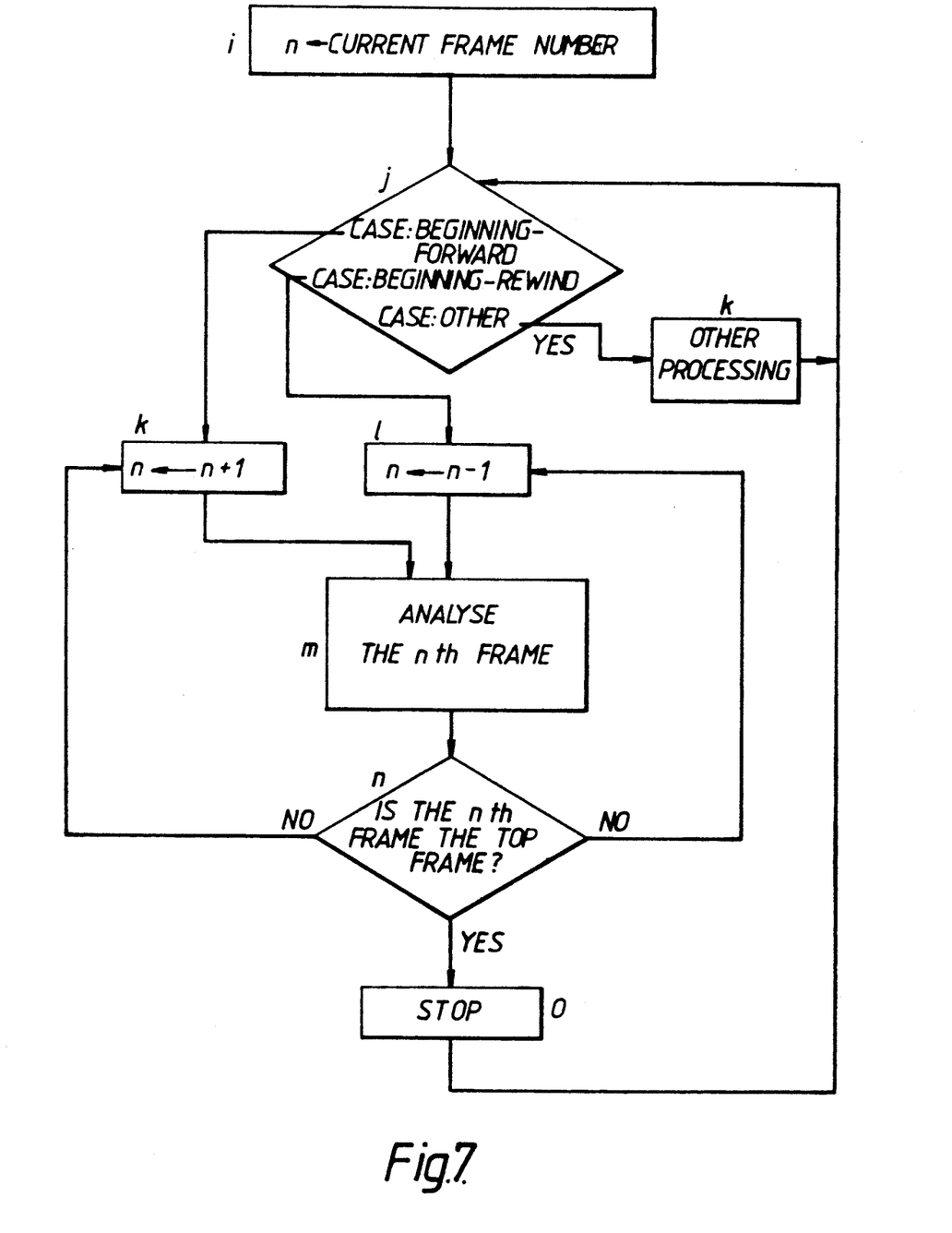
FIG. 7 shows a flow chart for a real time analysis according to the present invention.

Another method of operation of the analysis section does not utilize the beginning memory section and requires only a single operation. This process is shown in FIG. 7. After determining the current frame number n in step i, it is determined whether a beginning-forward, beginning-rewind or other mode is desired in step j. If other modes are utilized, that type of processing occurs in step a which does not form part of the present invention. For a beginning-forward mode the frame number is increased one step at a time and each current frame is then analyzed according to the data analysis section 6. If the current frame is the beginning frame of a scene, the process is stopped. If not the frame number returns to be increased by one until such a scene boundary is found. In the rewind situation the same process is followed except the frame number is counted down rather than counted up as shown in step 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A dynamic image control apparatus for controlling display of a dynamic image in a beginning forward-mode and in a beginning-rewind mode, comprising:
   dynamic image memory means for storing a plurality of image frames which form a plurality of sequential scenes of a dynamic image;
   measuring means for measuring a parameter of each video frame;
   detector means for detecting a beginning frame of a scene based on the measured parameter; and
   control means for stopping the dynamic image in the beginning-forward mode or in the beginning-rewind mode in accordance with the detected beginning frame.

2. The dynamic image control apparatus according to claim 1, wherein said measuring means measures one of illuminance, volume, color-tone and density of the dynamic image.

3. The dynamic image control apparatus according to claim 1, wherein the control means operates to stop the dynamic image in a play mode in accordance with the detected beginning frame.

4. The dynamic image control apparatus according to claim 1, further comprising input means for designating the beginning forward mode for finding the beginning frame in a forward direction and the beginning-rewind mode finding the beginning frame in a rewind direction.

5. The dynamic image control apparatus according to claim 1, further comprising a beginning memory means for memorizing a frame number of each beginning frame.

6. The dynamic image control apparatus according to claim 5, wherein the beginning memory means memorizes pointer numbers corresponding to the frame numbers of a plural beginning frames, the pointer numbers indicating the order of a series of scenes which begin at the corresponding frame numbers.

7. The dynamic image control apparatus as claimed in claim 1, wherein the detector means calculates the difference in the parameter for two neighboring frames and determines a beginning frame if the difference exceeds a threshold value.

8. A method of controlling a dynamic image in a beginning-forward mode and a beginning-rewind mode, comprising the steps of:
   memorizing a plurality of image frames which form a plurality of sequential scenes of a dynamic image;
   measuring a parameter of the dynamic image for each image frame;
   determining the difference in the parameter between neighboring frames;
   determining a beginning frame for a series of scenes when the difference exceeds a threshold; and
   controlling movement of the dynamic image to stop in the beginning-forward mode and in the beginning-rewind mode in accordance with the detected beginning frame.

9. The method of controlling according to claim 8, wherein said measuring step measures one of illuminance, volume, color-tone and density of the dynamic image.

10. The method according to claim 8, further comprising the step of memorizing frame numbers for plural beginning frames and a pointer number corresponding to each memorized beginning frame number, the pointers numbers indicating the order of a series of scenes which begin at the beginning frame numbers corresponding to said pointer numbers.

11. The method according to claim 8, wherein the step of controlling in the beginning forward mode comprises the steps of:
   increasing the pointer number by one; and
   moving the dynamic image to the frame number corresponding to the pointer number increased by one.

12. The method according to claim 8, wherein the step of controlling in the beginning-rewind mode comprises the steps:
   decreasing the pointer number by one; and
   moving the dynamic image to the frame number corresponding to the point number decreased by one.

* * * * *